US008561456B2

(12) United States Patent
Meredith et al.

(10) Patent No.: US 8,561,456 B2
(45) Date of Patent: Oct. 22, 2013

(54) FLUID DETECTION WITH A SPECTROMETER-ON-A-CHIP

(75) Inventors: Kimberly D. Meredith, Bellevue, WA (US); Morteza Safai, Seattle, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1231 days.

(21) Appl. No.: 12/210,170

(22) Filed: Sep. 12, 2008

(65) Prior Publication Data
US 2010/0064773 A1    Mar. 18, 2010

(51) Int. Cl.
*G01M 3/04* (2006.01)

(52) U.S. Cl.
USPC .............................................. 73/40; 356/328

(58) Field of Classification Search
USPC .................. 137/15.11; 356/326, 328
See application file for complete search history.

(56) References Cited

U.S. PATENT DOCUMENTS

| | | | | |
|---|---|---|---|---|
| 3,350,941 A * | 11/1967 | Misevich et al. | | 73/335.04 |
| 3,809,898 A | 5/1974 | Fries | | 250/303 |
| 5,200,615 A * | 4/1993 | Hopenfeld | | 250/302 |
| 5,822,271 A * | 10/1998 | Ead et al. | | 367/1 |
| 6,169,394 B1 * | 1/2001 | Frazier et al. | | 324/71.4 |
| 6,175,310 B1 | 1/2001 | Gott | | 340/605 |
| 6,313,646 B1 * | 11/2001 | Davis et al. | | 324/690 |
| 6,639,517 B1 | 10/2003 | Chapman et al. | | 340/605 |
| 6,683,297 B2 * | 1/2004 | Schulz et al. | | 250/227.16 |
| 7,086,275 B2 * | 8/2006 | Bock | | 73/40 |
| 7,590,498 B1 * | 9/2009 | Chung et al. | | 702/51 |
| 2004/0229377 A1 | 11/2004 | Chen et al. | | 436/173 |
| 2008/0125930 A1 | 5/2008 | Johnson | | |

FOREIGN PATENT DOCUMENTS

WO    WO 94/28372 A1    12/1994

OTHER PUBLICATIONS

Mohamed Gad-el-Hak, "The MEMs Handbook", CRC Press, ISBN:0849300770, p. 22-4 (2001).
"Compact MEMS High-Speed Fourier Transform Spectrometer," CTR Carinthian Tech Research AG, www.ctr.at.
Richard A. Crocombe, "MEMS technology moves process spectroscopy into a new dimension," Spectrosc.Eur 16(3), pp. 16-19 (2004).
Fiber Optic Determination of N2, O2, and Fuel Vapor in the Ullage of Liquid-Fuel Tanks, http://www.techbriefs.com/index2.php?option=com_content&task=vi (May 2008).
"Ensuring leak integrity in the aerospace industry: News from Adixen Sensistor," www.engineeringtalk.com/news/sis/sis105.html.
Burton Figler, "Portable Fuel Leak Detector," http://ads.ari.uni-heidelberg.de/abs/1987apc..rept.....F.

* cited by examiner

*Primary Examiner* — Peter Macchiarolo
*Assistant Examiner* — Tamiko Bellamy
(74) *Attorney, Agent, or Firm* — Hugh P. Gortler

(57) ABSTRACT

A liquid detection device for detecting liquid at a location on a structure includes a nanoscale spectrometer-on-a chip, and a fluid-absorptive element for absorbing liquid at the location and also securing the chip to the structure. Fluid absorbed by the element is analyzed by the spectrometer.

20 Claims, 5 Drawing Sheets

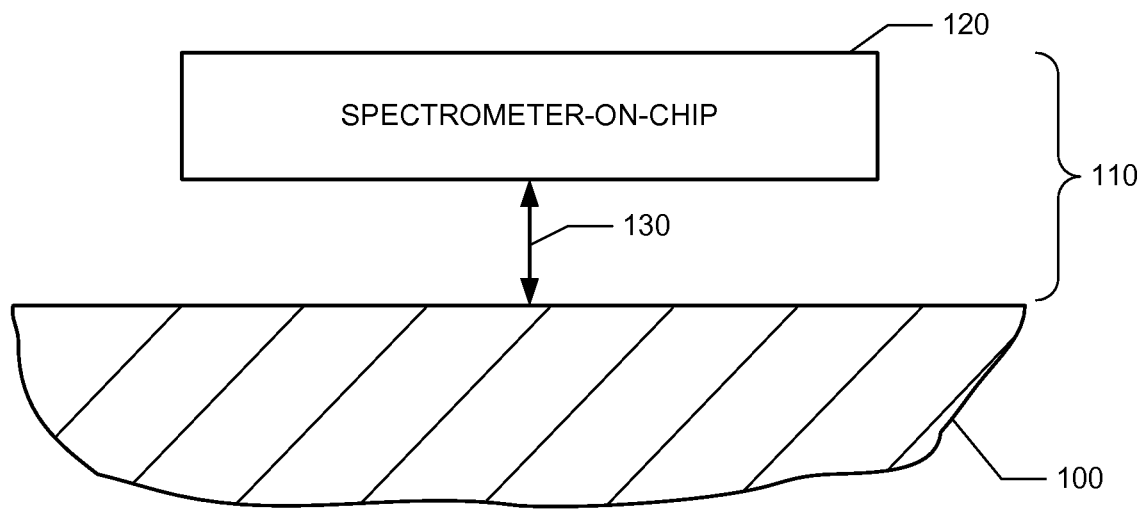
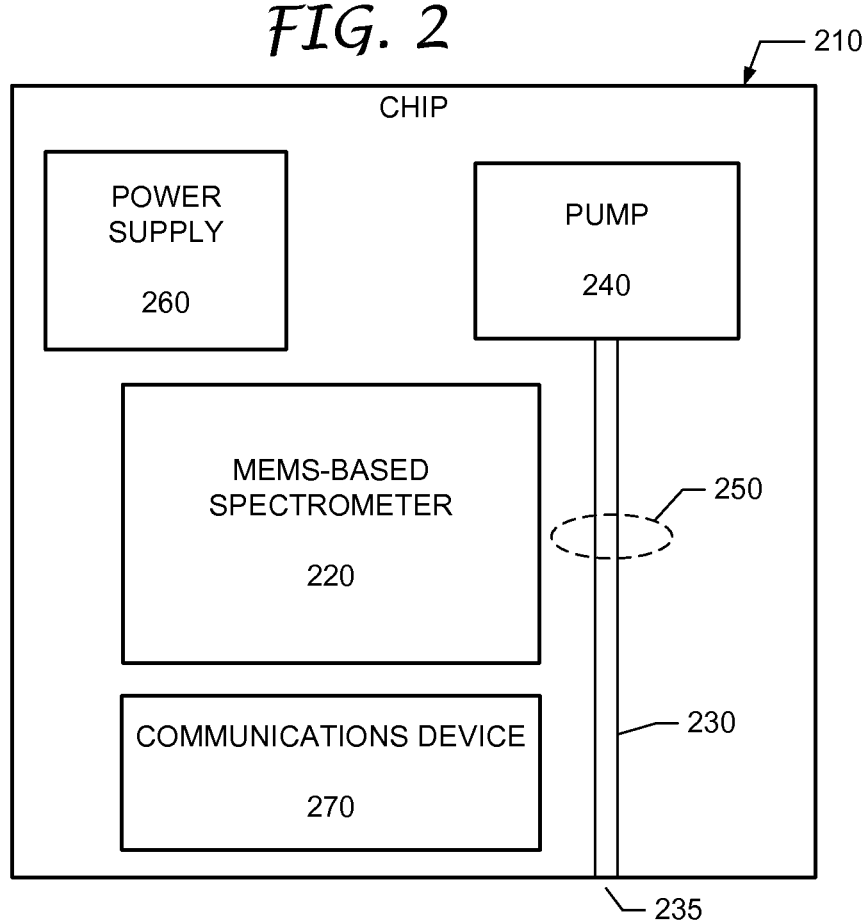

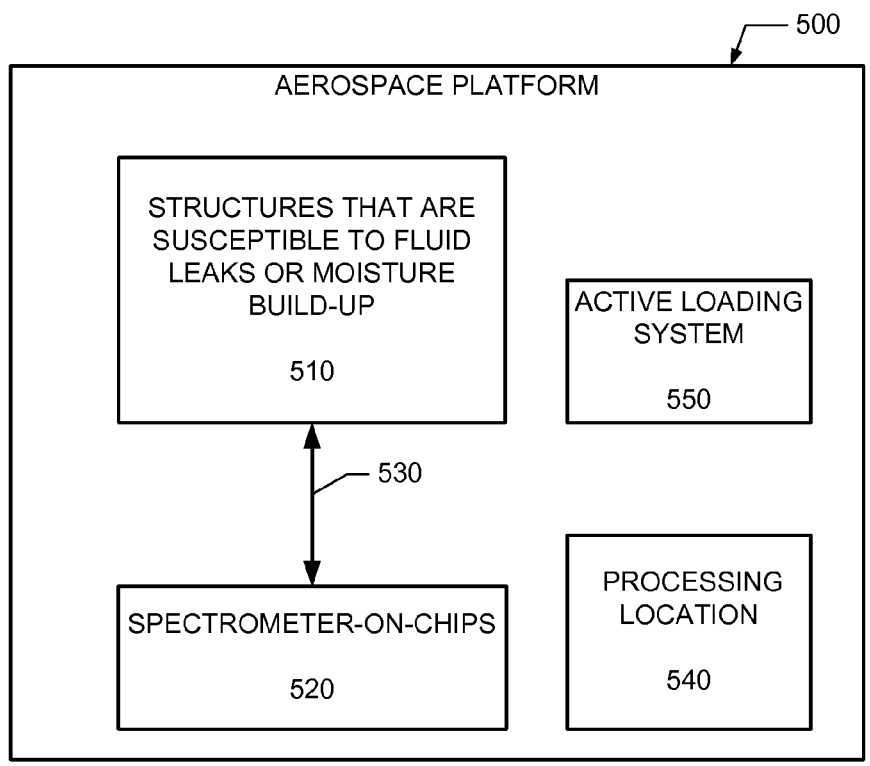
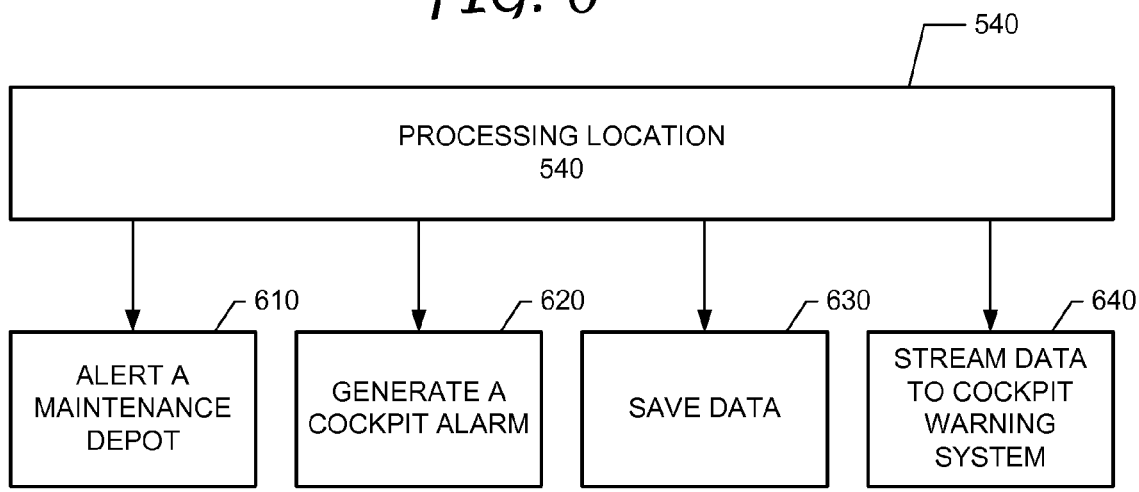

FLUID DETECTION WITH A SPECTROMETER-ON-A-CHIP

BACKGROUND

Fuel leaks are known to occur in aircraft fuel distribution systems and holding tanks. Fuel leaks can reduce fuel economy and cause other problems, such as corrosion.

Corrosion can also occur from a build-up of moisture. On commercial aircraft, moisture build-up is common under galleys and lavatories, and near doorways and other openings. Moisture can also be trapped in honeycomb panels, and other "sandwich" structures having light weight and low strength.

Moisture and resulting corrosion on commercial aircraft is often remote, and visual inspection for corrosion involves costly removal of galleys, lavatories, panels and floorboards. Such inspection results in significant down time during aircraft delivery and dispatch delays in the customer fleets after delivery.

Moreover, visual inspection of moisture and corrosion can take many man-hours. The inspection is also very costly, especially when an aircraft is inspected but no moisture or corrosion is found. Time and money will have been wasted.

Continuous detection of fuel leaks and moisture build-up aboard an aircraft can identify potential problems. Continuous detection of fuel leaks and moisture build-up can also reduce manual labor and wasted time. Therefore, continuous fuel leak and moisture detection aboard an aircraft is highly desirable.

SUMMARY

According to an embodiment herein, a liquid detection device for detecting liquid at a location on a structure includes a nanoscale spectrometer-on-a chip, and a fluid-absorptive element for absorbing liquid at the location and also securing the chip to the structure. Fluid absorbed by the element is analyzed by the spectrometer.

According to another embodiment herein, an aerospace platform includes a structure susceptible to fuel leaks or moisture build-up, and a plurality of chips secured to different locations about the structure by fluid absorptive elements. Each chip includes a spectrometer for performing a spectral analysis on fluid absorbed by a corresponding element.

According to another embodiment herein, a method of equipping an aircraft with moisture and leak detection includes securing a plurality of chips to structures that are susceptible to fuel leaks or moisture build-up. The chips are secured with material that absorbs fluid. Each chip includes a spectrometer in fluid communication with the absorptive securing material. Each spectrometer includes means for drawing in fluid from the absorptive material and performing spectral analysis on the drawn-in fluid.

According to another embodiment herein, a fluid detection chip includes a substrate, a fluid channel formed in the substrate, a microfluidics pump for drawing fluid through the channel, a semiconductor laser formed on the substrate, a MEMS-controlled optical system for focusing light from the semiconductor laser onto a location of the channel, a detector formed on the substrate, and a MEMS-controlled optical grating for receiving light from the location and focusing spectrum lines onto the detector.

BRIEF DESCRIPTION OF THE DRAWINGS

FIG. 1 is an illustration of a liquid detector secured to a structure.

FIG. 2 is an illustration of a chip for liquid detection.

FIG. 5 is an illustration of an aerospace platform including a system for leak and moisture detection.

FIG. 6 is an illustration of a method of using data from one or more liquid detection chips.

DETAILED DESCRIPTION

Figure 3:
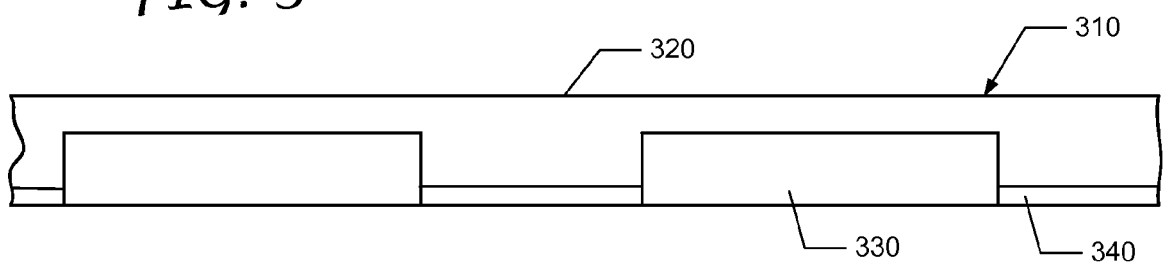
FIG. 3 is an illustration of a flex tape including one or more liquid detection chips.

Reference is made to FIG. 1, which illustrates a liquid detector 110 for detecting leaks from, or moisture within, a structure 100. The structure 100 is not limited to anything in particular. As a first example, the structure 100 includes a fuel tank, and the liquid detector 110 is configured to detect leaks from the fuel tank. As a second example, the structure 100 includes a hydraulic line, and the liquid detector 110 is configured to detect leaks from the hydraulic line. As a third example, the structure 100 includes a honeycomb panel, and the liquid detector 110 is configured to detect a build-up of moisture within the panel. Other examples include, but are not limited to, a liquid detector 110 that is configured to detect leaks around the aircraft pressure domes, holding tanks, fuel pump assemblies, fuel lines, fire bottles, cargo areas, and areas that require liquid cooling (e.g., electronics, portions of environmental control systems).

The liquid detector 110 includes a spectrometer-on-a chip 120. The chip 120 can perform a spectral analysis of a fluid to identify components of the fluid, which allows the type of the fluid to be identified. The ability to distinguish fluids is advantageous for leak detection. On a fuel tank, for example, the ability to distinguish leaking fuel from moisture can minimize the occurrence of false alarms.

The spectrometer may be MEMS-based (MEMS refers to microelectromechanical systems). A nanoscale MEMS-based spectrometer may be fabricated on the chip 120 with semiconductor technology. Resulting is a low cost, low power spectrometer that can provide continuous monitoring and analysis of leaks and moisture.

The liquid detector 110 further includes an element 130 (e.g., tape, an adhesive) for securing the chip 120 to the structure 100. The element 130 is also fluid-absorptive. As such, the element 130 absorbs fluid on the structure 100 in its vicinity. Fluid absorbed by the element 130 is then transported to, and analyzed by, the spectrometer 120. In this manner, the fluid-absorptive element 130 adapts the spectrometer-on-a-chip 120 for liquid detection. The fluid-absorptive element 130 may also conform to a surface of the structure 100, making it easier to secure to the structure 100.

The fluid-absorptive element 130 is represented schematically by a line. In practice, the element 130 can be realized in different ways. Several different embodiments will be described below. As one example, the fluid-absorptive element 130 may be a layer of hydroscopic polymer. A flexible polymeric layer can conform to a surface of the structure.

In some embodiments, the fluid-absorptive element 130 may be an adhesive hydroscopic material that is coated or sprayed onto a surface of the structure. A chip 120 can be mounted on the sprayed material. Spraying the hydroscopic adhesive material is particularly advantageous for mounting a chip in a hard-to-access region.

In some embodiments, a chip 120 may be integrated with a structure 100. As a first example, a chip 120 is embedded in a structure 100 during the manufacturing of the structure 100. As a second example, a structure 100 itself provides a substrate for the chip 120), whereby elements of the chip 120 (e.g., a spectrometer) are formed on the structure 100.

The structure is not limited to anything in particular. For example, the chip may be integrated with a honeycomb panel by placing the chip between the walls and securing it to the core. The chip is placed in a location where fluid is likely to accumulate. The fluid-absorptive element 130 absorbs fluid that accumulates inside the panel.

Reference is now made to FIG. 2, which illustrates an example of a chip 210 including a nanoscale MEMS-based grating spectrometer 220. The spectrometer 220 analyzes fluid at an inspection area 250. For example, a laser generates a beam, and the beam is focused onto fluid at the inspection area 250. The beam may be focused by focusing optics, which is controlled by a MEMS device. The fluid at the inspection area 250 reflects, scatters, and absorbs the beam. Transmitted and scattered light is reflected by an optical grating and focused by a MEMS device into spectrum lines. The spectrum lines are detected by a detector such as a linear CCD detector.

The chip 210 further includes a fluid channel 230 that extends from a fluid inlet 235 and transports fluid to the inspection area 250. The fluid inlet 235 is in fluid communication with the liquid-absorptive element.

The chip 210 further includes a pump 240 for transporting fluid through the channel 230. The pump 240 may be a microfluidic pump of the type used in the medical industry. Such a pump can draw nanoliters of fluid from the fluid inlet 235, through the fluid channel 230, and past the inspection area 250.

The chip 210 may further include a power supply 260 for supplying on-chip power. In some embodiments, the power supply 260 may include a storage device such as a battery.

In some embodiments, the power supply 260 can harvest power from the environment in which it is operated. Consider a chip 210 for a structure that subjected to mechanical vibrations. The power supply 260 may include a piezoelectric device for translating the vibrations to electrical energy. Electric energy released by the piezoelectric device can be stored on and used by the chip 210. Or consider a chip 210 that is constantly exposed to the solar radiation. The power supply 260 may include a solar cell for converting sunlight to electrical energy. Other forms of energy that could be harvested include, but are not limited to, fluid motion and temperature gradients. Power harvesting can be used in combination with a storage device such as a battery.

The chip 210 may further include a communications device 270. In some embodiments, the communications device 270 may transmit raw data off the chip 210 to another device (e.g., a computer), which processes the raw data to determine whether a leak has occurred or whether moisture has built up, or which stores the raw data for future diagnostics. In some embodiments, the communications device 270 may include a real-time digital signal processor for processing the raw data, and then sending results (e.g., an alarm) to another device (e.g., a maintenance computer or a central network station) indicating whether a leak has occurred or moisture has built up. Communications may be wired or wireless.

This low power chip 210 may perform "continuous" monitoring. The spectrometer 220 can continuously sample the liquid at the inspection area 250.

Continuous monitoring has its advantages. For one, the chip 210 can detect leaks and moisture build-up as the leaks and moisture build-up occur.

A monitoring system herein may include a single chip or multiple chips. One or more chips can be placed at locations where the structure is susceptible to leakage. Multiple chips can be arranged in a regular pattern (e.g., a grid) covering a structure. An advantage of covering a structure with multiple chips is that leaks and moisture build-up can be localized.

Reference is now made to FIG. 3. In some embodiments, the fluid-absorptive element may include a "flex tape" 310. The flex tape 310 includes a carrier 320 made of a flexible dielectric material. One or more chips 330 are embedded in the carrier 320. Conductors 340 may also be embedded in the carrier 320. The conductors 340 can carry power, data signals, etc. For flex tape that includes multiple chips, the conductors 340 may include buses for networking the chips.

The flex tape 310 may be adhered to the structure, for example, by an adhesive backing. The adhesive between the flex tape 310 and the structure will be hydroscopic, so fluid is transported to the chip(s) 330. Part of the flex tape 310 may be hydroscopic and rest can be hydrophobic. The ratio and design of the hydroscopic to hydrophobic can be adapted for different portions of the structure, and hence can be used across different geometries, environmental conditions, and materials.

Figure 4A:
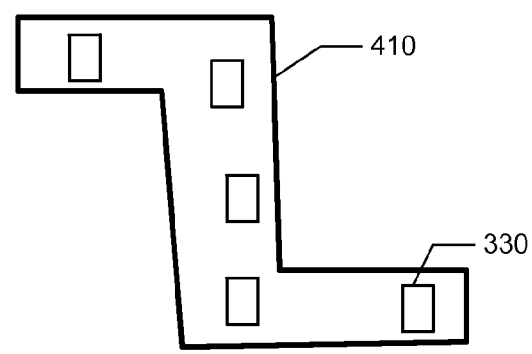
FIGS. 4a and 4b are illustrations of different shapes for a flex tape.
Figure 4B:
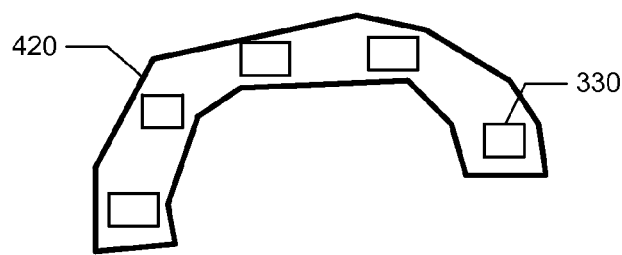

The flex tape is not limited to any particular geometry. In some embodiments, a flex tape can have the shape of a strip. FIGS. 4a and 4b show other shapes of flex tapes 410 and 420. In general, the shape of a flex tape may be customized to the surface of the structure that will be monitored.

A liquid detection system herein is not limited to any particular platform. One or more detectors may be used to detect leaks and moisture in aerospace platforms, pipelines, refineries, submarines and other submersible vehicles, large oil tankers, underground storage facilities, nuclear waste holding tanks, etc.

Reference is made to FIG. 5, which illustrates one such platform: an aerospace platform 500. The aerospace platform 500 may be, for example, an aircraft, unmanned aerial vehicle, space station, space capsule or satellite. The aerospace platform 500 includes different structures 510 that carry fluid or are susceptible to fluid build-up. These structures 510 include, but are not limited to, fuel tanks, fire bottles, hydraulic lines, honeycomb panels, and compartments for electronics that must be protected from moisture. Some or all of these structures 510 may be continuously monitored for fluid leaks or moisture build-up, or both.

Each structure 510 may be monitored by securing a plurality of spectrometer-on-chips 520 to different locations about the structure 510. The chips 520 may be secured by fluid absorptive element 530 (the elements 530 are represented collectively by a single line). Each spectrometer performs a spectral analysis on fluid absorbed by a corresponding element 530. At least some spectrometers can distinguish between leaked liquid and other types of fluid.

The chips 520 may be networked together. Communications to on-board systems and maintenance devices may be wired or wireless or a combination of both.

One of the on-board systems may include a processing location 540 (e.g., a central network location) for processing signals generated by the chips 520. The chip-generated signals may include raw data, processed data, warning signals, etc. The processing location 540 may be able to localize a problem area on a structure 510. That is, nature and location of a problem may be determined. Problems may be localized by periodically polling the chips 520.

Additional reference is made to FIG. 6. The processing location 540 may also take a course of action in response to a detected leak or moisture build-up. For example, the processing location 540 could alert a maintenance depot (block 610), send an alarm to a cockpit (block 620), save data for a ground maintenance crew (block 630), send data to a diagnostic system, etc. Data may be streamed continuously to the aircraft's central computing and cockpit warning system, which can order a shutdown of any aircraft systems made vulnerable by a fuel leak or other leak (block 640). The shutdown could be performed automatically (e.g., by a closed loop control in a fuel delivery system) or manually (e.g., by a pilot). Water ingress can also be identified so removal or structural repair can be performed.

The aerospace platform 500 may further include a system 550 for active loading of at least one of the structures 510. Such loads would cause very small defects to open sufficiently to be detected, hence providing early leak detection and prevention. An active loading system 550 can be passive (i.e., operate and detect under existing load conditions) or active, with loads applied via pressure loading or RF or other structural loading techniques. Active loading may be performed by gas pressure loading (with helium, for example). Active loading can also include standard use loading, including takeoff and in-flight conditions.

A liquid detection system described herein is advantageous for aerospace platforms. The chips are low in cost and light in weight. They consume low power and have a small footprint.

A liquid detection system described herein is autonomous, and will not interfere with or compromise the systems or structures of the aerospace platform. It can reduce operating costs, and simplify and shorten current moisture and leak detection processes.

In the case of aircraft, a liquid detection system herein can improve fleet safety by providing in-operation, real-time moisture and leak detection. Monitoring can be made available across different environmental conditions, including gate cargo load conditions, taxi, take-off, flight, and landing conditions.

Figure 7:
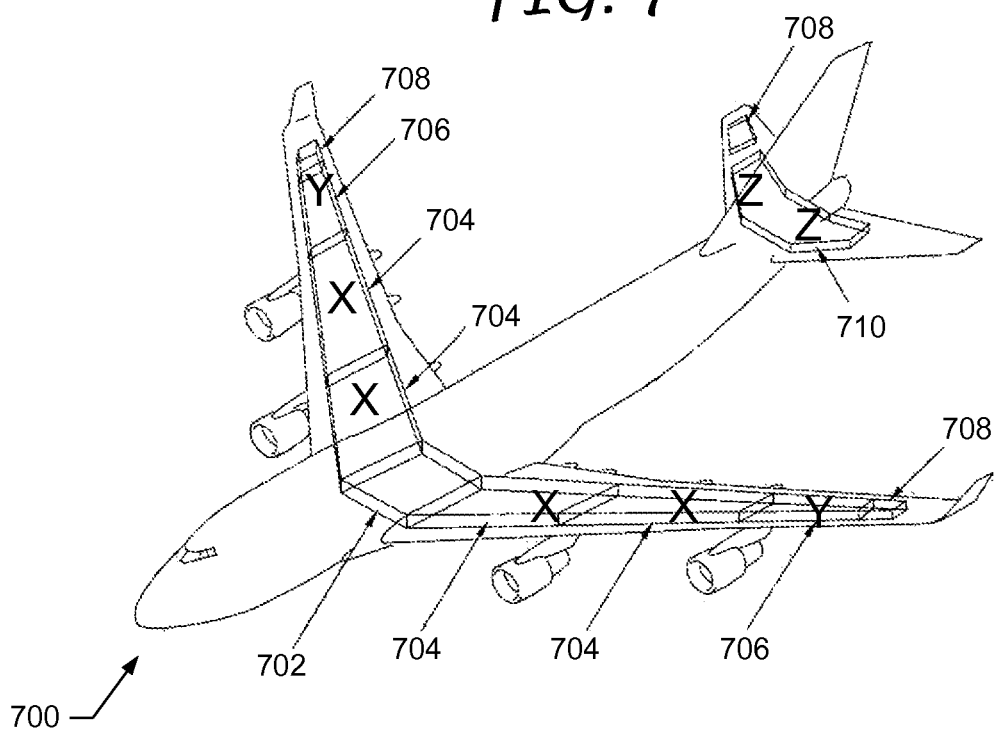
FIG. 7 is an illustration of different locations on an aircraft for networked liquid detection chips.

Reference is made to FIG. 7, which illustrates different locations of chips for continuously monitoring fuel distribution and storage areas of an aircraft 700. The aircraft 700 includes a center wing tank 702, a plurality of main tanks 704 in each wing, and a plurality of reserve tanks 706 and vent surge tanks 708 in the wings and horizontal stabilizers. One or more chips (denoted by "X") are secured to different locations on the outer surface of each main fuel tank 704. One or more chips (denoted by "Y") may be secured to different locations on the outer surface of each reserve tank 706. One or more chips (denoted by "Z") may be secured to different locations on the outer surface of each horizontal stabilizer tank 710. Although not shown, one or more chips may be secured to the vent surge tanks 708, on fuel lines, near coupling areas, etc.

Figure 8:
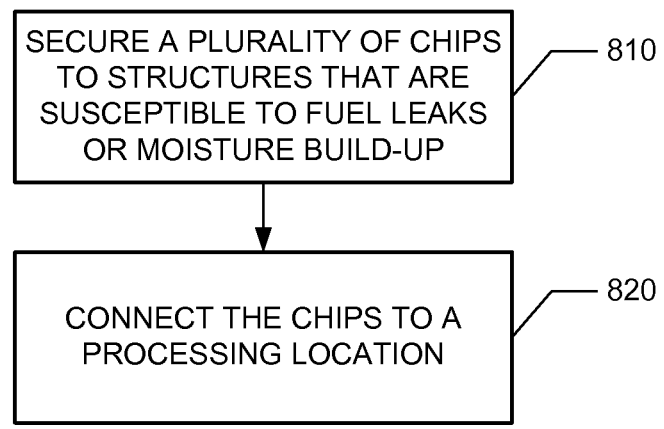
FIG. 8 is an illustration of a method of equipping an aircraft for moisture and leak detection.

Reference is made to FIG. 8, which illustrates a method of equipping an aircraft for continuous monitoring of leaks and moisture build-up. The method includes securing a plurality of chips to structures that are susceptible to fuel leaks or moisture build-up (block 810). Each chip includes a spectrometer. The chips are secured with material that absorbs fluid, such that the chips can perform spectral analysis on any fluid that is absorbed by the material.

The method further includes connecting the chips to one or more processing locations (block 820). This could be done via wires, or wirelessly, or by a combination of the two. For example, flex tapes could be used to provide wired connections from the chips to a wireless hub, and a wired or wireless connection could be established between the wireless hub and a central processing location.

Figure 9:
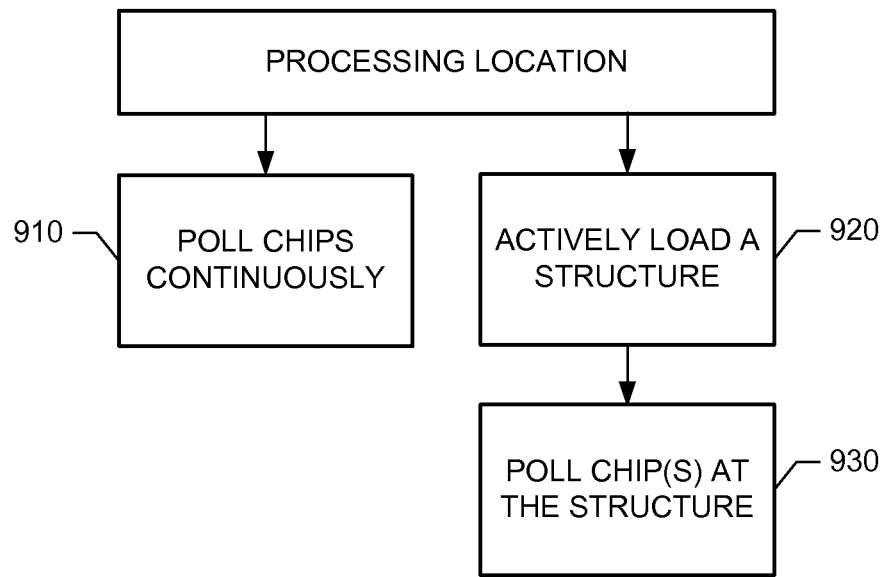
FIG. 9 is an illustration of a method of operating a moisture and leak detection system.

Reference is now made to FIG. 9, which illustrates a method of operating a moisture and leak detection system. The chips are controlled by a processing location (e.g., a flight computer, a maintenance computer, a diagnostics computer). The chips can be polled continuously to determine whether any leaks or moisture build-up is detected (block 910). In addition to continuous polling, one or more chips covering a structure can be polled (block 930) following active loading of the structure (920). The active loading sufficiently opens microcracks, etc, and the detection allows these locations to be identified and repaired, hence providing early leak detection and prevention.

Figure 10:
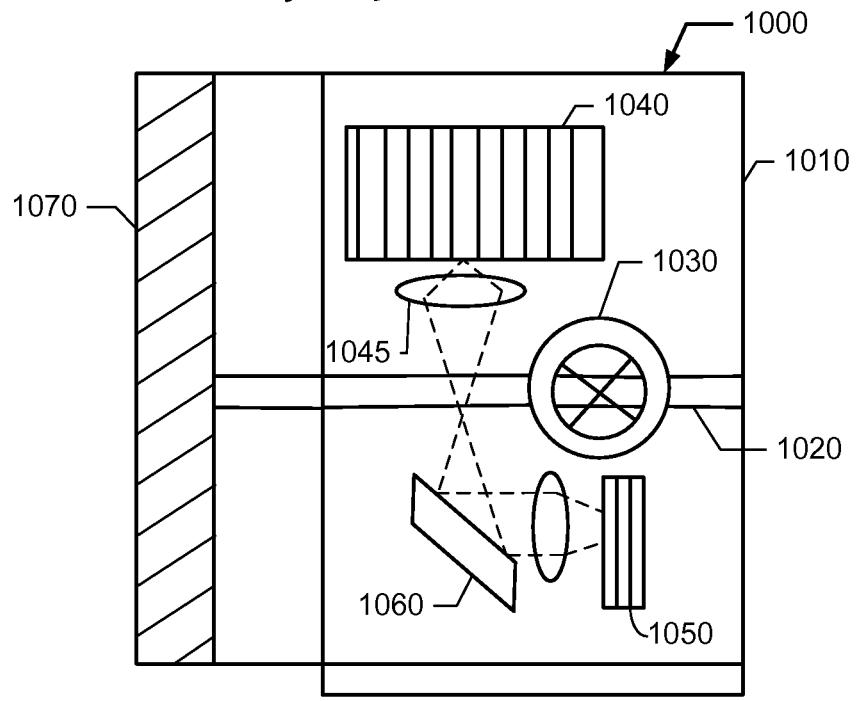
FIG. 10 is an illustration of a chip for fluid detection.

Reference is now made to FIG. 10, which illustrates a semiconductor chip 1000 including a substrate 1010, a fluid channel 1020 formed in the substrate 1010, a microfluidics pump 1030 for drawing fluid through the channel 1020, a semiconductor laser 1040 formed on the substrate 1010, a MEMS-controlled optical system 1045 for focusing light from the semiconductor laser 1040 onto an inspection location of the channel, a detector 1050 formed on the substrate 1010, and a MEMS-controlled optical grating 1060 for receiving light from the location and focusing spectrum lines onto the detector 1050.

In some embodiments, a single chip 1000 may include multiple detectors 1050. For example, multiple linear silicon arrays of identical design may be arranged in a regular grid. In other embodiments that use multiple detectors 1050, the detectors 1050 may be made of varying, interchangeable sizes and have a random or pseudorandom arrangement.

If used for fluid detection, the chip 1000 also includes a fluid-absorptive element 1070. In some embodiments, the fluid-absorptive element 1070 may be made of a hydroscopic polymer. In other embodiments, the liquid-absorptive element 1070 may be a nanotubes-type structure which can be fabricated on the chip 1000 by chemical deposition or semiconductor processes.

In some embodiments, the chip 1000 can be manufactured without the liquid absorptive element. For instance, the chip 1000 might use an absorptive element 1070 that secures the chip to the structure Or, the chip may be used for gas detection. Gas detector chips can be fabricated without the fluid-absorptive element or with gas inlets in place of the fluid absorptive element. Such chips may be used, for example, to detect gas leaks.

The invention claimed is:

1. A liquid detection device for detecting liquid at a location on a structure, the device comprising:
    a nanoscale spectrometer-on-a chip; and
    a fluid-absorptive element for absorbing liquid at the location and also securing the chip to the structure;
    wherein fluid absorbed by the element is analyzed by the spectrometer.

2. The device of claim 1, wherein the spectrometer includes a fluid channel and a microfluidic pump for pumping nanoliters of fluid through the channel; a detector; and a semiconductor laser and associated optics for creating spectrum lines during fluid detection and focusing the spectrum lines onto the detector.

3. The device of claim 1, wherein the fluid-absorptive element is configured to transport the fluid from the structure to the chip.

4. The device of claim 1, wherein the fluid-absorptive element includes a surface-conformable layer of hydroscopic material.

5. The device of claim 1, wherein the fluid-absorptive element includes a hydroscopic adhesive.

6. The device of claim 1, further comprising a power-harvesting device for supplying power to the chip.

7. The device of claim 1, wherein the fluid absorptive element includes flex tape.

8. The device of claim 7, wherein the flex tape includes a flex conductor adhered to the structure, the chip embedded in the flex conductor.

9. A liquid detection system for an aircraft, the system comprising a plurality of the devices of claim 1, the chips placed at different locations about a structure that carries fluid, each chip including a spectrometer for detecting fluid at its corresponding location.

10. An aerospace platform comprising:
a structure susceptible to fuel leaks or moisture build-up; and
a plurality of chips secured to different locations about the structure by fluid absorptive elements, each chip including a spectrometer for performing a spectral analysis on fluid absorbed by a corresponding element.

11. The platform of claim 10, wherein at least some spectrometers can distinguish between leaked liquid and other types of fluid.

12. The aerospace platform of claim 10, wherein the chips are networked together.

13. The aerospace platform of claim 12, wherein the fluid-absorptive elements include flex tape for carrying the chips and conductors, the conductors carrying signal to and from the chips, the tape securing the chips to the structure.

14. The aerospace platform of claim 10, further comprising processing means, responsive to the chips, for localizing a problem area on the structure.

15. The aerospace platform of claim 10, further comprising means, responsive to the chips, for taking a course of action in response to detected fluid.

16. The aerospace platform of claim 10, further comprising means for actively loading the structure to expose leaks, and using the chips to locate the leaks.

17. The aerospace platform of claim 10, wherein the structure includes a fuel tank.

18. A method of equipping an aircraft with moisture and leak detection, the method comprising securing a plurality of chips to structures that are susceptible to fuel leaks or moisture build-up, the chips secured with material that absorbs fluid, each chip including a spectrometer in fluid communication with the absorptive securing material, each spectrometer including means for drawing in fluid from the absorptive material and performing spectral analysis on the drawn-in fluid.

19. A liquid detection device for detecting liquid at a location on a structure, the device comprising: a fluid-absorptive element for absorbing liquid at the location and also securing a fluid detection chip to the structure; wherein the fluid detection chip comprises:
a substrate;
a fluid channel formed in the substrate;
a microfluidics pump for drawing fluid through the channel;
a semiconductor laser formed on the substrate;
a MEMS-controlled optical system for focusing light from the semiconductor laser onto a location of the channel;
a detector formed on the substrate; and
a MEMS-controlled optical grating for receiving light from the location and focusing spectrum lines onto the detector.

20. The chip of claim 19, wherein the fluid absorptive element includes nanotubes.

* * * * *